C. B. COOMBS.
STEERING DEVICE FOR AUTOMOBILES.
APPLICATION FILED NOV. 20, 1916.
1,284,179.
Patented Nov. 5, 1918.
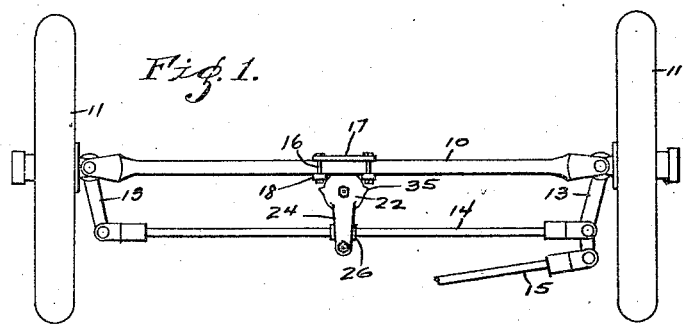
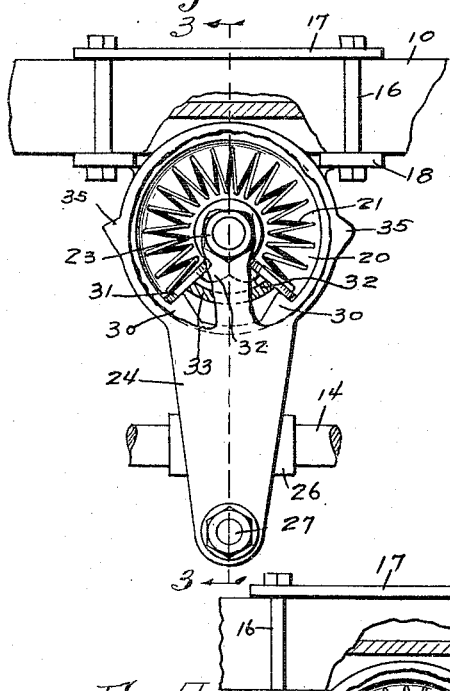
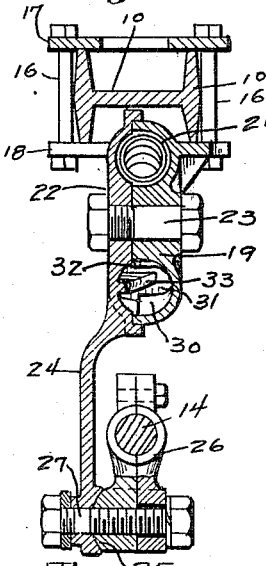
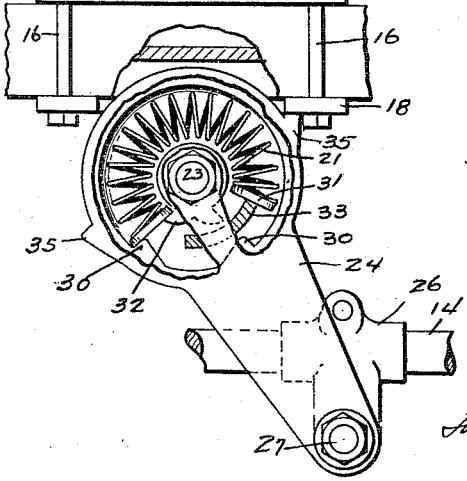
INVENTOR
CARL B. COOMBS
BY
Lockwood & Lockwood
ATTORNEYS

UNITED STATES PATENT OFFICE.

CARL B. COOMBS, OF INDIANAPOLIS, INDIANA, ASSIGNOR TO THE MEIXELL COMPANY, OF INDIANAPOLIS, INDIANA, A CORPORATION.

STEERING DEVICE FOR AUTOMOBILES.

1,284,179.

Specification of Letters Patent.

Patented Nov. 5, 1918.

Application filed November 20, 1916. Serial No. 132,374.

*To all whom it may concern:*

Be it known that I, CARL B. COOMBS, a citizen of the United States, and a resident of Indianapolis, county of Marion, and State of Indiana, have invented a certain new and useful Steering Device for Automobiles; and I do hereby declare that the following is a full, clear, and exact description thereof, reference being had to the accompanying drawings, in which like letters refer to like parts.

The object of this invention is to provide an attachment for an automobile steering device for holding the wheels straight under spring tension so that they may be turned and are then automatically brought back to their normal running position.

One feature of the invention is to stabilize the front wheels or the steering of automobiles which do not have worm driven steering gears or similar means in the steering gear for stabilizing the front wheels. This invention is adapted to be used on automobiles so as to do away with the free play of the front wheels, whereby automobiles of this type may be more easily steered and kept under perfect control.

The above is accomplished by means of a spring resting in the housing which is secured to the axle and to the tie rod of the automobile so that when the wheels are turned in one direction, said spring will be compressed in that direction and tend to bring the wheels back into normal running position by the tension thereof. This appliance has a tendency to hold the wheels in steady normal position so that obstructions in the road, such as chuck holes and rocks, when striking the wheels, will not throw them out of control of the driver and make it necessary for him to return the wheels to their normal position every time they strike such an obstruction.

Another feature of the invention is to provide means for preventing the wheels being turned too far in one direction, so as to buckle under and upset.

Still another feature of the invention is the construction of the bearing of the attachment which will greatly strengthen it and make it more durable.

The full nature of the invention will be understood from the accompanying drawings and the following description and claims.

In the drawings, Figure 1 is a plan view looking down on the tie rod and axle of an automobile showing the appliance in position. Fig. 2 is a plan view of the appliance with parts broken away. Fig. 3 is a cross section on the line 3—3 of Fig. 2. Fig. 4 is a plan view of the appliance in operated position with parts removed.

In the drawings there is shown the front axle 10 of an automobile having wheels 11, steering knuckles 13, a tie rod 14 pivoted to said steering knuckles, and a steering rod 15 pivoted thereto so as to operate said steering mechanism.

Secured to the axle by means of the bolts 16 are plates 17 and 18. The plate 18 is integral with a spring housing 19 which is provided with an annular groove 20 in which a circular spiral spring 21 is adapted to rest. There is an actuating member 22 having a circular groove adapted to register with the groove 20, pivotally secured to the housing 19 by a bolt 23, so that it may oscillate thereon, said plate having an arm 24 extending therefrom, which rides on a semi-ball bearing 25 of the clamping member 26 and pivoted thereto by a bolt 27. The clamping member 26 is adapted to clamp about the tie rod 14 so that the arm 24 will be pivotally secured to said tie rod. In order that the appliance may at all times permit the tie rod to freely move to and from the axle in the process of turning the wheels, the clamping member 26 is so constructed that the distance from the center of the tie rod to the center of the pivot bolt 27 is equal to the distance from the axle to the center of the bolt 23 about which the attachment is adapted to move as a center, thereby compensating for the distance in the movement of the appliance about the center of the bolt or pivot pin 23, for the distance it is removed from the axle.

Secured to the housing 19 there are inwardly extending lugs 30, extending into the groove 20 from the periphery thereof, so as to engage the disks or washers 31 which are engaged on their other sides by the lugs 32 extending inwardly from the center of said housing. Extending downwardly from the member 22 into said groove there is a projection 33 adapted to engage both of said disks, as appears in Fig. 2, so that when the steering mechanism is moved so as to operate the attachment in one direction, as shown in Fig. 4, the spring will be engaged by the projection 33 moved by said member so as to compress the spring against the disk 31, which is held in position by the lugs 30 and 32. The same operation will result when the attachment is moved in the opposite direction. It may, therefore, be readily seen that the spring 21 has a tendency to always return the steering mechanism to its normal running position.

Extending outwardly from the plate 22 there are ears or lugs 35 which are so positioned as to engage the plate 18 when the attachment is moved into its farthest position, as shown in Fig. 4. These lugs prevent the steering mechanism from being operated too far in one direction so as to prevent serious accidents occurring when the steering wheels are moved beyond their normal turning position, thereby causing the throwing of a tire or the upsetting of the automobile. At the same time they permit the full normal turn of the wheels.

The invention claimed is:

1. The combination with the front axle of an automobile and a steering mechanism including a tie rod, of a horizontally disposed attachment between the axle and tie rod adapted to influence the action of the tie rod including a housing anchored to the axle and having an annular recess in one face thereof, an oscillatory member pivoted to said housing and having an annular recess registering with the recess of the housing and having part thereof pivoted to the tie rod, a coil spring seated in the cavity formed by said recesses, means depending from the oscillatory part for compressing either end of said spring, and stops on the housing against one of which an end of the spring may abut, while the other end of the spring is being compressed by the movement of the oscillatory member.

2. The combination with the front axle of an automobile, and a steering mechanism including a tie rod, of a steering attachment comprising a housing, means to secure the housing to the axle, said housing having an annular semi-circular recess, an actuating member pivoted to the housing and having a semi-circular recess for registration with the recess in the housing and forming a complete circular recess, an arm extending from said actuating member, means for pivotally attaching the free end of the arm to the tie rod, a coil spring inclosed within said circular recess and having its ends terminating at opposite sides of said arm, stops arranged in pairs in said housing and extending in the path of the ends of said spring, a projection extending downwardly from said arm and in the path of the ends of said spring, said projection having the same radial curvature as the radial curvature of said circular recess, the ends of the projection terminating substantially in line with said stops when said arm is not in action and engaging and compressing the spring when the arm is swung in the arc of a circle by the movement of the tie rod.

3. The combination with an automobile having a front axle and a steering mechanism including a tie rod, of an attachment therefor, including a housing secured to said axle, said housing having an annular semicircular recess, an actuating member having a semicircular recess adapted to register with the recess in said housing, and form a complete circular recess in cross section, an arm extending from said actuating member, a downwardly extending projection on the actuating member adapted to move in the circular opening provided by said recesses, stops arranged in pairs on said housing and extending inwardly into said circular opening, said pairs of stops being positioned in line with the ends of said projection when said arm is in inoperative position, a pair of disks in said circle, one at each end of said projection of a diameter substantially equal to the diameter of the circle, and a coil spring in said circle having its ends abutting said disks to force said disks against said shoulders, said disks causing the spring to compress when the arm is swung laterally in either direction.

In witness whereof I have hereunto affixed my signature.

CARL B. COOMBS.

Copies of this patent may be obtained for five cents each, by addressing the "Commissioner of Patents, Washington, D. C."